United States Patent Office 3,812,040
Patented May 21, 1974

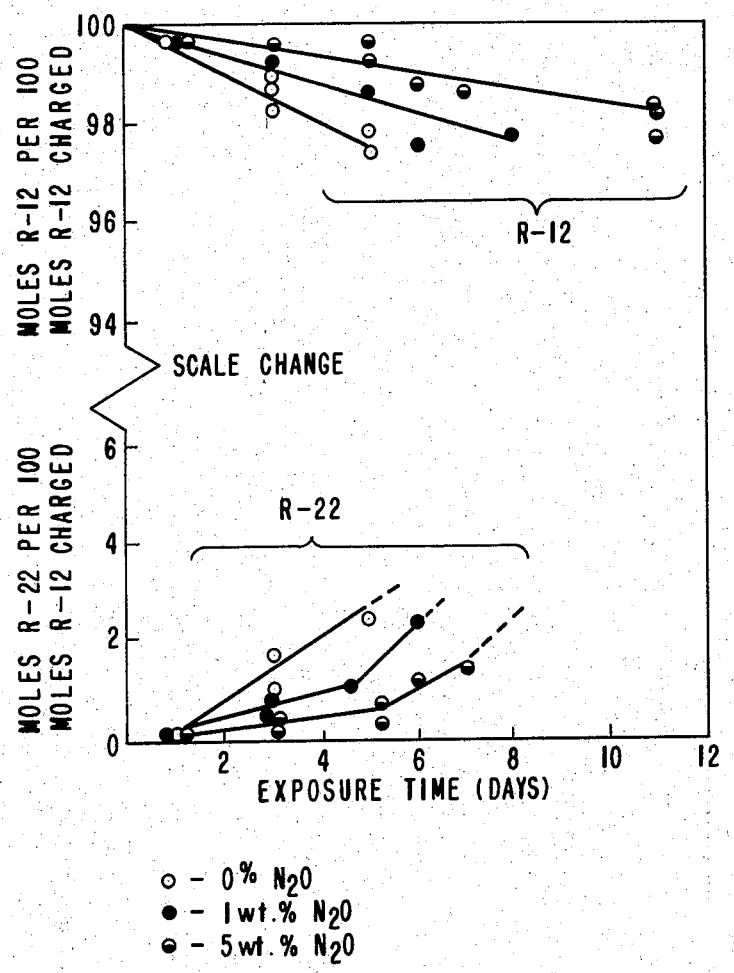

3,812,040
HEAT TRANSFER FLUIDS
Hans J. Borchardt, Wilmington, Del., assignor to E. I. du Pont de Nemours and Company, Wilmington, Del.
Continuation-in-part of abandoned application Ser. No. 190,938, Oct. 20, 1971. This application Aug. 11, 1972, Ser. No. 279,834
Int. Cl. C09a 3/02
U.S. Cl. 252—68
9 Claims

ABSTRACT OF THE DISCLOSURE

An improved heat transfer process carried out with a circulating fluid selected from dichlorodifluoromethane, 1,2-dichloro - 1,1,2,2 - tetrafluoroethane, 1,1-difluoroethane and mixtures thereof, which process comprises circulating as the heat transfer medium said fluid admixed with about 0.1–10 weight percent, based on the fluid weight, of nitrous oxide.

CROSS-REFERENCE TO RELATED APPLICATION

This application is a continuation-in-part of application Ser. No. 190,938 filed Oct. 20, 1971 and now abandoned.

BACKGROUND OF THE INVENTION (1) Field of the invention

The invention relates to a heat transfer process utilizing a transfer medium comprising dichlorodifluoromethane, 1,2-dichloro-1,1,2,-tetrafluoroethane, 1,1 - difluoroethane or mixtures thereof.

(2) Description of the prior art

Vapor-compression heat transfer processes are well known in the art for both heating and refrigeration purposes. Dichlorodifluoromethane has long been known and used as a transfer medium in such processes. Midgley et al. in Industrial and Engineering Chemistry 22, No. 5, page 542 et seq. disclose an industrial preparation of dichlorodifluoromethane and suggest its use as a refrigerant. In the art this compound is often referred to as Refrigerant 12 or R–12.

Although R–12 is a widely used refrigerant, it is well recognized that it decomposes by reaction with refrigeration oil at elevated temperatures, such as 200° C., in the presence of iron. Since refrigeration oil is normally present and iron is a common material of construction of refrigeration apparatus, the R–12 either must be used at a temperature below the decomposition temperature or the system in which it is employed will have a reduced life.

Spauschus et al. in Journal of the American Society of Heating, Refrigeration and Air Conditioning Engineers, February 1961, pages 65–69, report the reactions of R–12 on exposure at high temperatures to a hydrocarbon refrigeration oil and iron-comprising surfaces. They show by analysis of the decomposition products that the destruction of R–12 is not due to simple thermal degradation but is the result of an iron catalyzed reaction between R–12 and the refrigeration oil. They suggest that the initial reaction of R–12 with lubricating oil involves the exchange of a chlorine atom of R–12 with a hydrogen atom of the oil, thus producing chlorodifluoromethane a refrigerant called R–22, and a chlorinated oil. Finally, they suggest that little chlorine remains in chemical combination with the oil since it is, for the most part, immediately released in the form of hydrogen chloride by abstraction of a hydrogen atom bound to an adjacent carbon atom of the oil, thus yielding an unsaturated oil. The unsaturated oil can polymerize and cyclize to produce sludges, tars and varnish. These in turn can restrict and ultimately plug capillary tubes and foul valves, thus leading to system failure. The hydrogen chloride produced can attack metal parts and cause internal corrosion which can also contribute to system failures.

Other refrigerants which, like dichlorodifluoromethane, are used as heat transfer media include 1,2-dichloro-1,1,2,2-tetrafluoroethane, often referred to as Refrigerant 114 or R–114, 1,1-difluoroethane, often referred to as Refrigerant 152a or R–152a, and the R–12/R152a azeotrope containing about, by weight, 74% R–12 and 26% R–152a, often referred to as refrigerant 500 or R–500.

R–114 and R–152a also are known to decompose under high temperature conditions in vapor compression-refrigeration systems wherein hydrocarbon oils and iron are present. The chemical nature of the decomposition has not been studied in the same detail as has the decomposition of R–12. Although the details of the degradation of R–114 and R–152a are not exactly the same as in the degradation of R–12, it has been found that hydrogen chloride is formed from R–114 under the conditions under which it is formed from R–12. Moreover, the decomposition of both R–114 and R–152a in the presence of hydrocarbon oil and iron is accompanied by attack on the oil and the formation of dark-colored sludges, tars and varnish.

SUMMARY OF THE INVENTION

In a heat transfer process employing as the heat transfer medium a circulating fluid selected from dichlorodifluoromethane, 1,2 - dichloro-1,1,2,2-tetrafluoroethane, 1,1-difluoroethane and mixtures thereof, the improvement which comprises utilizing as the heat transfer medium said fluid admixed with about 0.1–10 weight percent, based on the fluid weight, of nitrous oxide.

BRIEF DESCRIPTION OF THE DRAWING

The figure is a graph showing rate comparisons of R–12 consumption and R–22 formation upon exposure of various R–12 mixtures to hydrocarbon refrigeration oil and composite metal specimens of steel, aluminum and copper at 204° C.

DETAILED DESCRIPTION OF THE INVENTION

It has now been discovered that the stability of R–12, R–114, R–152a and mixtures thereof can be improved when used as fluid heat transfer media in refrigeration processes, particularly in the presence of hydrocarbon oils and iron, by incorporating therein about 0.1–10 weight percent, based on the fluid weight, of nitrous oxide. The process of this invention has application throughout the field of heat transfer, particularly where the heat transfer process is carried out by circulating the above described heat transfer media in a closed loop system. One such type of heat transfer process is a vapor-compression heat transfer process which is well known in the art. A system set up to carry out this process will generally contain an evaporator wherein normally the liquid heat transfer medium boils at low temperature to produce cooling; a compressor to raise the pressure and temperature of the gaseous transfer medium; and a condenser wherein the compressed gaseous medium is condensed and discharges its heat to the environment. There is also present an expansion device through which the liquid medium expands from the high pressure level in the condenser to the low pressure level in the evaporator. If the process is to be a refrigeration process, useful cooling, that is, the cooling effect, occurs at the evaporator. If the process is to be a heating process, for example, when a heat pump is required, useful heating occurs at the condenser where the transfer medium discharges its heat.

As has been stated previously, when R-12 is utilized as the heat transfer medium in these processes and when these processes are carried out at temperatures up to about 200° C. in the presence of iron (a common material of apparatus construction), there occurs an iron catalyzed reaction between the R-12 and the hydrocarbon oils present, for example, refrigeration oils, which reaction causes the decomposition of the R-12 in the system and the formation of the previously discussed harmful by-products. The term iron as used herein includes iron alloys and iron compounds such as iron oxide. The catalysis of the reaction is not necessarily effected by the original iron, iron compound or iron alloy but may be effected by an iron compound formed in the heat transfer system from the original iron, iron compound or iron alloy. The term hydrocarbon oils as used herein refers to any of the hydrocarbon oils which are well known in the art and are commonly used in heat transfer apparatus. Such commercially available materials include "Suniso" 3GS oil and "Capella" B oil. Reactions having similar results occur when R-114 and R-152a and mixtures thereof are utilized as heat transfer media.

The concentration of nitrous oxide in the heat transfer media of this invention should be at least 0.1 weight percent, based on fluid weight. Concentrations in excess of about 10 weight percent generally are to be avoided because of excessive pressure buildup due to the partial pressure of the nitrous oxide. Usually, the concentration of nitrous oxide is 0.5-2.0 weight percent. Most preferred is a concentration of about 1 weight percent.

In the following examples, unless otherwise indicated all quantities are by weight.

EXAMPLE 1

The resistance of R-12 to reaction with hydrocarbon refrigeration oil is readily seen by reference to the drawing. This figure is a graphic representation of the results of tests conducted to determine the comparative decomposition rates of various R-12 mixtures, used in the process of this invention, when they were exposed to refrigeration oil and iron (steel), aluminum and copper at a temperature of 204° C. The graph also shows the comparative rates of R-22 formation resulting from the same R-12 mixture exposures in the same process.

A plurality of sets of aluminum, steel and copper specimens weighing, respectively, 1.5, 4.3 and 5.0 grams were wired together with copper wire and placed in open end glass tubes. The metals, of types commonly used in the construction of refrigeration systems, were TS aluminum No. 1100, cold rolled steel No. 1010 and purified copper. After addition of 2 cc. of refrigeration oil to each tube, the tubes were evacuated to remove air and then frozen in liquid nitrogen; 2 cc. of liquid R-12 and nitrous oxide, in amounts indicated below, were then added by condensation, after which the tubes were sealed with a torch. The refrigeration oil used was "Suniso" 3GS, a high quality refrigeration oil having the following characteristics:

| | |
|---|---|
| Aromatics percent | 38 |
| Viscosity, SUS/99° C. by ASTM Method D2161 | 40.8 |
| Pour point ° C. | −43 |
| Floc. point ° C. | −56 |
| Sulfur percent | 0.05 |

Three sets of 10 tubes each were prepared, the first set containing no nitrous oxide, the second set containing 1 wt. percent nitrous oxide, based on the weight of R-12, and the third set containing 5 wt. percent nitrous oxide. The tubes were placed in a 204° C. oven for periods of time as indicated on the abscissa of the graphic figure. The appearance of the tube contents was observed and from time to time tubes were removed and opened for examination of the contents. This was done by first freezing them in liquid nitrogen, breaking off the tube tip and then attaching the tube to a vacuum train whereby the air introduced upon breaking open the tube was removed. The tube was then removed from the liquid nitrogen and the materials which were volatile at room temperature were collected in a trap and transferred therefrom into a final trap after passing through a water scrubber and drying tube. The final trap had been previously weighed while evacuated before the volatiles were transferred thereto. From these two weighings the weight of the volatiles collected was obtained. The volatiles were then transferred to standard gas sample bulbs and were subsequently analyzed by gas chromatography.

The results of analyses for R-12 decomposition and R-22 formation among the volatile materials are shown in the figure. The figure shows a graph of exposure time against the number of moles of R-12 remaining per 100 moles of R-12 originally present (top half of ordinate) and the number of moles of R-22 formed per hundred moles of R-12 originally present (bottom half of ordinate). The graph clearly shows that when nitrous oxide is mixed with the R-12 and used in the process of this invention, decomposition of R-12 and formation of R-22 are inhibited or retarded. Continued exposure at these high temperatures, subsequent to the time reflected in the graph resulted, in all three instances, in accelerated decomposition, rapid consumption of the R-12, R-22 and certain metals and the formation of black solids.

The conditions of the tests whose results appear on the graph are more severe than are the conditions of conventional commercial practice, for example, in a conventional compression refrigeration device. This is so because in these tests all of the R-12 and oil were heated, whereas, in an actual refrigeration device only a part of the R-12 and oil are exposed to high temperatures, notably that present at any given moment at the exit valve of the compressor. Further, the test temperature was higher than usually found in normal refrigeration device operation. Thus, the decomposition rates in these tests are several hundred times higher than would be expected in a practical refrigeration system. It is, however, generally recognized in the art that so called sealed tube stability tests, such as those herein, place materials in the correct order of stability.

EXAMPLE 2

A vapor-compression heat transfer system was set up utilizing as the compressor and condenser a "Tecumseh" No. AE5L condensing unit and as the expansion device an "ALCO" type TCLE 100FW valve. The evaporator was contained in a calorimeter. The secondary heat transfer fluid, that is, the heat transfer fluid in the calorimeter but outside of the evaporator, was heated by means of a heating coil in said calorimeter to maintain a constant temperature. The power needed to maintain constant temperature was measured with a wattmeter and was equal to the heat carried from the evaporator by the heat transfer medium (inside the evaporator).

Approximately 1,100 grams of R-12, containing 1 wt. percent nitrous oxide, was charged into the system and the compressor was started. The expansion valve was varied until the temperature of the R-12/nitrous oxide fluid at the discharge side of the value was −9° C. The power input to the calorimeter was varied until the temperature at the discharge end of the evaporator remained steady at 18° C. This resulted in a temperature increase at the condenser to about 45° C. from an ambient of 32° C. From the wattmeter it was found that heat was being pumped from the evaporator at the rate of 1,180 B.t.u./hr.

EXAMPLE 3

This example demonstrates the retardation of the degradation of R-114, R-152a and the R-12/152a azeotrope by 1 wt. percent nitrous oxide, based on the weight of heat transfer medium, in the presence of hydrocarbon oil and steel, copper and aluminum coupons. In the manner of Example 1, coupons of the above metals, 2 cc. of the above heat transfer media and 2 cc. of hydrocarbon oil were charged to glass tubes and sealed; the tubes were held at 204° C. for 30 days. The colors of the mixtures were followed with time as an indication of the degree of degradation of the medium and attack on the hydrocarbon oil. In the case of the tubes containing R-114, the amount of chloride ion present after 30 days was determined by the method of Armstrong, American Society of Heating, Refrigeration and Air Conditioning Engineers Transactions 71, part I, page 150 et seq. (1965). From this value the percent of decomposition of the heat transfer medium was calculated. The results are shown in the following table. The reported results for R-114 and the azeotrope are based on duplicate runs.

TABLE

| Medium | $N_2O$ (percent) | Color 10 days | Color 30 days | Percent decomposition (30 days) |
|---|---|---|---|---|
| R-114 | 0 | | Amber brown | 2.2 |
| R-114 | 1 | | Yellow | 1.2 |
| R-152a | 0 | | Brown | |
| R-152a | 1 | | Yellow | |
| R-12/R-152a | 0 | Brown | | |
| R-12/R-152a | 1 | Amber | | |

Nitrous oxide did not retard the degradation of 1,1,2-trichloro-1,2,2-trifluoroethane, sometimes used in centrifugal refrigeration systems, when this heat transfer medium was subjected to the same tests. The contents of tubes containing 1 wt. percent nitrous oxide were black after five days as were those containing no nitrous oxide.

The embodiments of the invention in which an exclusive property or privilege is claimed are defined as follows:

1. In a heat transfer process wherein a heat transfer medium selected from dichlorodifluoromethane, 1,2-dichloro-1,1,2,2-tetrafluoroethane, 1,1-difluoroethane and mixtures thereof contacts iron and hydrocarbon oil and wherein said heat transfer medium is decomposed by an iron catalyzed reaction with said hydrocarbon oil, the improvement which comprises retarding the iron catalyzed decomposition reaction by utilizing as the heat transfer medium said medium admixed with about 0.1-10 weight percent, based on the medium weight, of nitrous oxide.

2. The process of claim 1 wherein the medium is admixed with 0.5-2.0 weight percent nitrous oxide.

3. The process of claim 1 wherein the medium is admixed with 1 weight percent nitrous oxide.

4. A heat transfer medium which is useful in the heat transfer process wherein the medium is in contact with iron and a hydrocarbon oil, said medium consisting essentially of 1,1-difluoroethane admixed with about 0.1-10 weight percent of nitrous oxide.

5. The mixture of claim 4 wherein the 1,1-difluoroethane is admixed with 0.5-2.0 weight percent of nitrous oxide.

6. The mixture of claim 4 wherein the 1,1-difluoroethane is admixed with about 1 weight percent of nitrous oxide.

7. A heat transfer medium which is useful in the heat transfer process wherein the medium is in contact with iron and a hydrocarbon oil, said medium consisting essentially of the azeotrope of dichlorodifluoromethane and 1,1-difluoroethane admixed with about 0.1-10 weight percent of nitrous oxide, said azeotrope containing about, by weight, 74% dichlorodifluoromethane and 26% 1,1-difluoroethane.

8. The mixture of claim 7 wherein the azeotrope is admixed with 0.5-2.0 weight percent nitrous oxide.

9. The mixture of claim 7 wherein the azeotrope is admixed with about 1 weight percent nitrous oxide.

References Cited

UNITED STATES PATENTS

| 2,964,165 | 12/1960 | Riley | 252—305 X |
| 3,184,533 | 5/1965 | Eiseman | 174—17 |
| 3,223,791 | 2/1966 | Miles | 252—305 X |
| 3,532,631 | 10/1971 | Spauschus | 252—68 |

OTHER REFERENCES

"Solubility of Compressed Gases in Fuorocarbons," Dantzler et al., Soap & Chemical Specialties, January 1965, pp. 125, 126, 146 and 151.

LEON D. ROSDOL, Primary Examiner

H. A. PITLICK, Assistant Examiner

U.S. Cl. X.R.

252—67